United States Patent [19]

Reuter et al.

[11] 3,928,463

[45] Dec. 23, 1975

[54] PROCESS FOR THE PREPARATION OF TERTIARY METHYL-PHOSPHINE OXIDES

[75] Inventors: Martin Reuter, Kronberg, Taunus; Walter Rupp, Konigstein, Taunus, both of Germany

[73] Assignee: Hoechst Aktiengesellschaft, Frankfurt am Main, Germany

[22] Filed: Apr. 11, 1974

[21] Appl. No.: 460,133

[30] Foreign Application Priority Data

May 24, 1974 Germany............................ 2357279

[52] U.S. Cl........................................ 260/606.5 P
[51] Int. Cl.².................................. C07D 105/02
[58] Field of Search............................ 260/606.5 P

[56] References Cited
UNITED STATES PATENTS

| | | | |
|---|---|---|---|
| 3,291,840 | 12/1966 | Buckler et al. | 260/606.5 P |
| 3,293,302 | 12/1966 | Popoff et al. | 260/606.5 P |
| 3,477,953 | 11/1969 | Carlson | 260/606.5 P X |
| 3,660,495 | 5/1972 | Kingso Chingtsung Lin | 260/606.5 P |

OTHER PUBLICATIONS

Chemical Abstracts, Vol. 70, 115227s (1969) corresponds to Kamai et al., Zb. Obshch, Zkim, V39(2) pp.379-382 (1969).

Trippett, J. Chem. Soc. pp. 2813-2816 (1961).

Chemical Abstracts, Vol. 68, 39721q (1968).

Chemical Abstracts, Vol. 66, 65626r (1967).

Chemical Abstracts, Vol. 56, 1475q and 6002e (1962).

Chemical Abstracts, Vol. 70, 20112m (1969).

Chemical Abstracts, Vol. 68, 87350q (1968).

*Primary Examiner*—Helen M. S. Sneed
*Attorney, Agent, or Firm*—Curtis, Morris & Safford

[57] ABSTRACT

A process is provided for the catalytic preparation of tertiary methylphosphine oxides which comprises mixing hydroxymethyl-alkylphosphines with at least 1 weight % of carbon tetrachloride or carbon tetrabromide at a temperature of from $-10°$ to $+120°C$, and, after the reaction is complete, isolating the tertiary methylphosphine oxide by distilling off the carbon tetrahalide.

13 Claims, No Drawings

PROCESS FOR THE PREPARATION OF TERTIARY METHYL-PHOSPHINE OXIDES

Subject of our copending application Ser. No. 460,151 filed Apr. 11, 1974 (corresponding to German Pat. Application No. P 23 19 043.4 filed in Germany on Apr. 14, 1973) is a process for the catalytic preparation of bis-(hydroxymethyl)-methylphosphine oxide, which comprises mixing tris-(hydroxymethyl)-phosphine with at least 1 weight % of carbon tetrachloride or carbon tetrabromide at temperatures of from −10° to +120°C, and, after complete reaction, isolating the bis-(hydroxymethyl)-methylphosphine oxide so obtained by distilling off the carbon tetrahalide and the solvent optionally used.

It was known to prepare bis-hydroxymethyl-methylphosphine oxide by oxidizing bis-hydroxymethyl-methylphosphine with hydrogen peroxide to form phosphine oxide according to usual methods; the bis-hydroxymethyl-methylphosphine being prepared from tris-hydroxymethyl phosphine by addition of methyl iodide and degradation of the tris-hydroxymethyl-methylphosphonium iodide with triethylamine according to the following reaction scheme:

(HOCH$_2$)$_3$P + CH$_3$I → (HOCH$_2$)$_3$P$^V$CH$_3$I P(O)CH$_3$

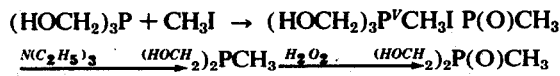

(see E. I. Grinstein, Chem. Abstracts, Vol.56, pp. 1475 and 6002, USSR Pat. No. 138,618, furthermore R. K. Valetchinov, Chem. Abstracts, Vol. 68, p. 8428).

However, the triethylamine degradation of tris-hydroxymethyl-methylphosphonium iodide proceeds with only poor yields, and there is a great expenditure in chemicals which are lost in the end.

G.Ch. Kamaj et al. (J. obsc. chimii, Vol. 39 (1969), pp. 379 to 382) describe tests according to which tri-(oxymethyl)-phosphine and carbon tetrachloride do not react with each other when when they are heated to boiling temperature.

In modification of our copending application Ser. No. 460,151 a process has now been found for the catalytic preparation of methylphosphine oxides of the formula (I)

where R$_1$ is an alkyl group having from 1 to 20, preferably from 1 to 4, especially 1 or 2 carbon atoms, which may be substituted, preferably monosubstituted, especially in ω-position, by groups inert under the reaction conditions such as —CN, —OR$_3$ (R$_3$ being an alkyl group having up to 10, preferably from 1 to 4, especially 1 or 2 carbon atoms), halogen, especially fluorine and/or chlorine; and R$_2$ is the same as R$_1$ or the —CH$_2$OH group; which process comprises mixing a hydroxymethyl-alkylphosphine of the formula (II)

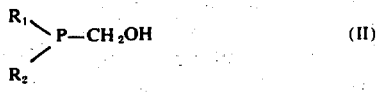

where R$_1$ and R$_2$ are as defined above, with at least 1 weight % of carbon tetrachloride or carbon tetrabromide at a temperature of from −10° to +120°C, and, after the reaction is complete, isolating the tertiary methylphosphine oxide of formula (I) obtained by distilling off the carbon tetrahalide and the solvent optionally used.

In formula (II), R$_1$ and R$_2$ may for example be methyl, ethyl, butyl, octyl, dodecyl, eicosyl, methoxymethyl, ethoxymethyl, 2-ethoxyethyl, 1-ethoxyethyl, 2-methoxypropyl, 3-ethoxypropyl, 4-butoxybutyl, 2-cyano-ethyl, 3-cyanopropyl, chloromethyl, 2-chloroethyl, 3-chloropropyl. R$_2$ is preferably —CH$_2$OH, R$_1$ preferably —CH$_3$, or —CH$_2$CH$_2$CN.

Catalysts used according to the present invention, are carbon tetrachloride or carbon tetrabromide.

Especially advantageous is the use of carbon tetrachloride.

The reaction according to the present invention proceeds at temperatures of from −10° to +120°C. Preferred are temperatures of from 5° to 80°C, especially from 20° to 70°C, and the exclusion of water and alcohols.

Since the reaction, which is a rearrangement of an oxygen atom from a —CH$_2$OH group to the P-atom according to the following scheme

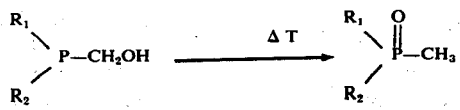

is exothermal, it is advantageous to operate with dilution in the presence of an inert organic solvent or suspension agent. Such diluents are for example benzene, octane, dimethyl formamide, benzonitrile, tetramethyl urea, methylene chloride, chloroform, chlorobenzene, ethers such as diisopropyl ether, esters such as ethyl acetate, or mixtures of these diluents. Preferably, a diluent is chosen the boiling point of which is the same as the desired reaction temperature. Relative to the hydroxymethylphosphine of formula (II) used, from ⅛ to 10-fold, preferably from 1 to 4-fold, weight amounts of diluent are added. When no diluent is used, temperatures of from 5° to 30°C are preferred.

The amount of carbon tetrahalide catalyzing the rearrangement of the hydroxymethylphosphine of formula (II) should be at least 1 weight %, relative to the phosphine employed. The upper limit is not critical, and the catalyst itself may also serve as diluent. Generally, from 10 to 2000 weight %, preferably from 20 to 1000 weight % of carbon tetrahalide are used, relative to the phosphine employed. When less than 100 weight % are used, the addition of one of the above diluents (from 100 to 1000 weight %) is preferred. The reaction time, depending on the reaction conditions, is from about 0.1 to 80 hours. Advantageously, the reaction is carried out with exclusion of oxygen. Generally, the catalyst amounts are smaller and the reaction times shorter the more the temperature is elevated.

Work-up is carried out in known manner after cooling of the reaction batch by distilling off the catalyst and the diluent, and, optionally, further purification of the crude product by recrystallization, for example from dimethyl formamide or ethanol.

The tertiary methylphosphine oxides obtained in accordance with the present invention may be applied in the manufacture of flameproof polyurethanes, and as intermediate products for syntheses especially of flameproofing or plant protection agents.

The following examples illustrate the invention.

EXAMPLE 1

Dimethyl-hydroxymethylphosphine oxide 43 g (0.4 mol) of methyl-bis-hydroxymethylphosphine were added dropwise with agitation at 78°C to a mixture of 60 cm$^3$ of benzene and 3 g (0.02 mol) of carbon tetrachloride being refluxed under a nitrogen atmosphere. The reaction was exothermic. The two-phase mixture was refluxed for a further 8 hours with agitation. Subsequently, the organo-phosphorus compound being the lower phase was separated and freed from residual benzene at 70°C under reduced pressure. 43 g of colorless oil were obtained which, on titration in an aqueous hydrochloric acid solution, did not decolorize an iodine-potassium iodide solution, that is, it did not contain any trivalent phosphorus, contrary to the starting phosphine. On inoculation, the oil solidified at 38°C to form a stiff crystal pulp. For purification, the crude dimethyl-hydroxymethylphosphine oxide was fractionated under highly reduced pressure, and it passed over at 0.8 torr (mm. Hg) and 152°–154°C after first runnings had been separated. In D$_2$O, this distillate showed the NMR spectrum of the known dimethyl-hydroxymethylphosphine oxide, that is, a doublet for the methyl protones at 1.4 and 1.7 ppm, a doublet for the methylene protons at 3.9 and 4.0 ppm and a singlet for the OH protons at 4.7 ppm, relative to tetramethyl-silane. The yield of the main fraction, boiling point 152°–154°C/0.8 torr, was 40 g.

The IR spectrum of the distillate, as in the case of (CH$_3$)$_2$ P(O)CH$_2$OH, showed the very intense PO band at 1140 cm$^{-1}$, an intense PC band at 1050 cm$^{-1}$, and an intense OH band at 3200 cm$^{-1}$, furthermore, an intense characteristic band at 940 cm$^{-1}$.

For a further purification, the distillate may be recrystallized from 2 parts of acetone. The melting point of the pure but very hygroscopic product was at 75°–78°C, the mixed melting point with the known (CH$_3$)$_2$P(O)CH$_2$OH showed no depression. The yield of dimethyl-hydroxymethylphosphine oxide was 80 % of the theoretical yield.

Elementary analysis: found: C, 32.8 %; H, 8.6 %; P, 27.9 %. calculated: C, 33.3 %; H, 8.3 %; P, 28.7 %.

EXAMPLE 2

Cyanoethyl-methyl-hydroxymethylphosphine oxide 15 g (0.1 mol) of bis-hydroxymethyl-cyanoethyl-phosphine (prepared by addition of 2 mols of paraformaldehyde to cyanoethylphosphine at 80°C) were added dropwise, at 78°C and under a nitrogen atomsphere, to a mixture being refluxed and containing 50 cm$^3$ of benzene and 2 cm$^3$ of CCl$_4$ (= 0.02 mol). The two-phase mixture was refluxed for 15 hours with agitation. Subsequently, the organo-phosphorus compound being the lower phase was separated and freed from benzene under reduced pressure. 14 g of colorless oil were obtained which, contrary to the starting compound, in an aqueous hydrochloric acid solution did not decolorize an iodine-potassium iodide solution, that is, it did not contain any trivalent phosphorus.

The oil was easily soluble in water, dimethyl formamide, acetonitrile and methanol, it was insoluble in chloroform and benzene, and it did not solidify at 0°C. It may be purified by fractional distillation under highly reduced pressure.

The NMR spectrum in D$_2$O, as in the case of (HOCH$_2$)$_2$PCH$_2$CH$_2$CN, contained a singlet for the OH protones at 4.7 ppm, although less intense, a doublet for the methylene protones of the CH$_2$OH group at 4.0 and 4.1 ppm, also less intense, a 10-band spectrum for the protones of the P—CH$_2$—CH$_2$—CN group at 1.9–3.1 ppm, and additionally an intense doublet at 1.5 and 1.7 ppm, which belonged to the methyl group; all relative to tetramethyl-silane.

The infrared spectrum of the reaction product contained the same band as the (CH$_3$)$_2$P(O)CH$_2$OH of Example 1, that is, a PO band at 1140 cm$^{-1}$ which is missing in the starting phosphine, and also the CN band at 2250 cm$^{-1}$.

The gas chromatogram after silylation with N,O-bis-trimethylsilyl-acetamide showed 86 % at an elution temperature of 198°C and 10 % at an elution temperature of 216°C; the latter hinting to NCCH$_2$CH$_2$P(O)(CH$_2$OH)$_2$ formed as by-product, which was proved by a NMR doublet of poor intensity at 4.15 and 4.2 ppm. The yield of cyanoethyl-methyl-hydroxymethylphosphine oxide was 75 % of the theoretical yield.

Elememtary analysis: Calculated: C, 40.7 %; H, 6.8 %; N, 9.5 %; P, 20.2 %. found: C, 40.0 %; H, 6.6 %; N, 9.3 %; P, 20.7 %.

We claim:

1. A process for the preparation of tertiary methyl phosphine oxide of the formula

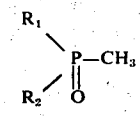

wherein R$_1$ is alkyl having up to 20 carbon atoms or alkyl having up to 20 carbon atoms and substituted by a group inert under conditions of the process, and R$_2$ is alkyl having up to 20 carbon atoms or alkyl having up to 20 carbon atoms and substituted by a group inert under conditions of the process or —CH$_2$OH, which comprises contacting a hydroxymethyl-alkyl phosphine of the formula

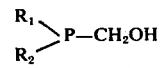

with at least about 1% by weight of carbon tetrachloride or carbon tetrabromide at a temperature between about −10° and about 120°C. substantially in the absence of oxygen, water and alcohol, and after reaction distilling off the carbon tetrahalide to isolate said tertiary methyl-phosphine oxide, the percent being based on the weight of said hydroxymethyl-alkyl-phosphine.

2. A process according to claim 1 wherein the reaction is conducted under an atmosphere of nitrogen and in an anhydrous and non alcololol alcoholic 3. A process according to claim 1 wherein from about 10 to about 2000% of said carbon tetrahalide is used.

4. A process according to claim 1 wherein from about 20 to about 1000% of said carbon tetrahalide is used.

5. A process according to claim 1 wherein the reactants are in an inert solvent, and said inert solvent is distilled off with said carbon tetrahalide.

6. A process according to claim 5 wherein said inert solvent is used in an amount of from about ⅛ to about 10 times the amount of said phosphine.

7. A process according to claim 1 wherein said temperature is between about 5° and about 80°C.

8. A process according to claim 1 wherein said temperature is between about 20° and about 70°.

9. A process according to claim 5 wherein up to about 100% of said carbon tetrahalide and from about 100 to about 1000% of said solvent are used.

10. A process according to claim 1 wherein said alkyl has 1 to 4 carbon atoms.

11. A process according to claim 1 wherein said inert group is —CN, halogen or —OR$_3$ wherein R$_3$ is alkyl having up to 10 carbon atoms.

12. A process according to claim 1 wherein said inert group is cyano, lower alkoxy, fluorine or chlorine.

13. A process according to claim 1 wherein R$_1$ is methyl or β-cyanoethyl and R$_2$ is hydroxymethyl.

* * * * *

UNITED STATES PATENT AND TRADEMARK OFFICE
CERTIFICATE OF CORRECTION

PATENT NO. : 3,928,463
DATED : December 23, 1975
INVENTOR(S) : Martin Reuter, et al.

It is certified that error appears in the above-identified patent and that said Letters Patent are hereby corrected as shown below:

In the Heading: Item "[30]" line 2, change "May 24, 1974" to -- November 16, 1973 --.

*Signed and Sealed this*

*thirtieth* Day of *March 1976*

[SEAL]

*Attest:*

RUTH C. MASON
*Attesting Officer*

C. MARSHALL DANN
*Commissioner of Patents and Trademarks*